United States Patent
Liles et al.

(10) Patent No.: US 7,544,734 B2
(45) Date of Patent: Jun. 9, 2009

(54) SILICONE OIL-IN-WATER (O/W) EMULSION COMPOSITIONS USEFUL FOR WATER REPELLENT APPLICATIONS

(75) Inventors: Donald Taylor Liles, Midland, MI (US); Shawn Keith Mealey, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 233 days.

(21) Appl. No.: 10/566,627

(22) PCT Filed: Jun. 16, 2004

(86) PCT No.: PCT/US2004/018974

§ 371 (c)(1), (2), (4) Date: Jun. 28, 2006

(87) PCT Pub. No.: WO2005/023935

PCT Pub. Date: Mar. 17, 2005

(65) Prior Publication Data

US 2007/0088122 A1     Apr. 19, 2007

Related U.S. Application Data

(60) Provisional application No. 60/498,240, filed on Aug. 27, 2003.

(51) Int. Cl.
*C08L 83/05*     (2006.01)

(52) U.S. Cl. .......................... 524/588; 524/837; 516/55
(58) Field of Classification Search ................. 524/588, 524/837; 516/55
See application file for complete search history.

(56) References Cited

U.S. PATENT DOCUMENTS

| | | | |
|---|---|---|---|
| 2,676,182 A | | 4/1954 | Daudt et al. |
| 4,310,678 A | | 1/1982 | Blizzard et al. |
| 4,370,365 A | * | 1/1983 | Takamizawa et al. ....... 427/387 |
| 4,423,095 A | | 12/1983 | Blizzard |
| 5,074,912 A | * | 12/1991 | Liles et al. ..................... 106/2 |
| 5,618,627 A | * | 4/1997 | Merrifield et al. ............ 428/447 |
| 5,895,794 A | * | 4/1999 | Berg et al. .................. 523/217 |
| 6,323,268 B1 | * | 11/2001 | Fisher et al. ................. 524/266 |
| 6,737,444 B1 | * | 5/2004 | Liu .............................. 516/55 |

\* cited by examiner

*Primary Examiner*—Margaret G Moore
(74) *Attorney, Agent, or Firm*—Alan Zombeck

(57) ABSTRACT

Compositions useful for providing water repellent characteristics to substrates contain (i) 0.1-99 percent by weight of a methylhydrogensiloxane; (ii) 0.1-99 percent by weight of a silanol endblocked siloxane; (iii) 0.1-99 percent by weight of a silicone resin; (iv) 0.1-10 percent by weight of at least one surface active agent; and (v) 0.01-5 percent by weight of at least one additive selected from the group consisting of a preservative, an antifoam, a mildewcide, a UV absorber/UV light stabilizer, and a freeze-thaw additive. The balance of the composition to 100 percent by weight is water.

2 Claims, No Drawings

SILICONE OIL-IN-WATER (O/W) EMULSION COMPOSITIONS USEFUL FOR WATER REPELLENT APPLICATIONS

CROSS REFERENCE TO RELATED APPLICATIONS

This application is a U.S. national stage filing under 35 U.S.C. §371 of PCT Application No. PCT/US2004/018974 filed on Jun. 16,2004, currently pending, which claims the benefit of U.S. Provisional Patent Application No. 60/498, 240 filed Aug. 27, 2003 under 35 U.S.C. §119 (e). PCT Application No. PCT/US2004/01 8974 and U.S. Provisional Patent Application No. 60/498,240 are hereby incorporated by reference.

This invention is related to compositions that are useful for imparting water repellent properties to substrates. In particular, it relates to compositions that have no propensity to cause silica fouling of high temperature processing equipment.

U.S. Pat. No. 6,323,268 (Nov. 27, 2001) describes compositions for rendering surfaces water repellent by combining (i) water; (ii) a methylhydrogensiloxane polymer or copolymer; (iii) an alkoxysilane; (iv) a silicone resin; (v) a volatile methyl siloxane; (vi) a cationic oil-in-water emulsion of an aminofunctional polydimethylsiloxane; and (vii) a surfactant. While such compositions are capable of imparting water repellent properties to many surfaces, they are unsuitable in applications involving the use of high temperature processing equipment. This is because compositions containing volatile silicon containing components have a propensity to cause silica fouling of high temperature processing equipment.

This problem has been solved in that water repellent compositions according to the invention, contain much lower amounts of volatile silicon containing components, and as a result have a lower propensity to cause silica fouling of high temperature processing equipment. In addition, compositions according to the invention contain lower levels of volatile organic compounds (VOC) and/or hazardous air pollutants (HAPs), such that their use does not require excessive pollution control equipment, in order to comply with existing air quality emission standards.

The invention is directed to a composition comprising (i) 0.1-99 percent by weight of a methylhydrogensiloxane; (ii) 0.1-99 percent by weight of a silanol endblocked siloxane; (iii) 0.1-99 percent by weight of a silicone resin; (iv) 0.1-10 percent by weight of at least one surface active agent; (v) 0.01-5 percent by weight of at least one additive selected from the group consisting of a preservative, an antifoam, a mildewcide, a UV absorber/UV light stabilizer, and a freeze-thaw additive; with the balance of the composition to 100 percent by weight comprising water.

These and other features of the invention will become apparent from a consideration of the detailed description.

DESCRIPTION

As noted above, the invention is directed to compositions that are useful for imparting water repellent properties to substrates. Compositions according to the invention are formed by combining a (i) methylhydrogensiloxane oligomer, polymer, or copolymer; (ii) a silanol endblocked siloxane polymer or oligomer; (iii) a silicone resin, (iv) one or more surface active agents; and (v) water. The composition may also contain other additives such as a preservative, an antifoam compound, a mildewcide, a UV absorber/UV light stabilizer, or a freeze-thaw stabilizer.

The Methylhydrogensiloxane

Suitable methylhydrogensiloxanes for use in this invention include compositions having the formula

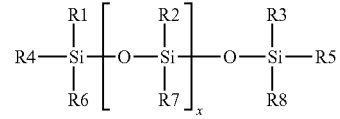

where R1 to R8 represent hydrogen or an alkyl group containing 1-6 carbon atoms, with the proviso that at least one of the groups R1 to R8 is hydrogen. In the formula, x is an integer of from 1 to about 200. Most preferred are compositions in which about one half of the groups R1 to R8 in the methylhydrogensiloxane are hydrogen, while the remainder of the groups are methyl groups.

One representative example of a methylhydrogensiloxane especially preferred for use herein is a trimethylsiloxy terminated methylhydrogensiloxane with a silicon-bonded hydrogen content of 1.4 to 1.75 weight percent, and having a viscosity between 1 to 40 centistoke ($mm^2$/sec.), preferably 2-5 centistoke ($mm^2$/sec.).

Methylhydrogensiloxane copolymers can also be used, and suitable copolymers include (alkylmethyl)(methylhydrogen)siloxane copolymers having the formula

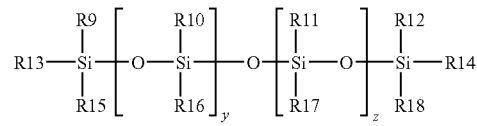

where the groups R9 to R18, except the groups R16 and R17, each represent an alkyl group containing 1-6 carbon atoms, typically a methyl group, R16 represents hydrogen, and R17 represents an higher alkyl group containing more than about six carbon atoms. The values of y and z can be from 1 to about 200.

Such methylhydrogensiloxane polymers and copolymers are commercially available from such manufacturers as the Dow Corning Corporation, Midland, Mich., and are described, for example, in U.S. Pat. No. 5,074,912 (Dec. 24, 1991) and U.S. Pat. No. 5,919,296 (Jul. 6, 1999).

The Silanol Endblocked Siloxane Oligomer/Polymer

The silanol endblocked siloxane oligomer and/or polymer used herein has a structure that can be represented generally by the formula shown below:

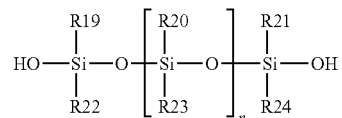

In the formula, the R19 to R24 groups generally comprise alkyl groups containing 1-6 carbon atoms such as methyl, ethyl, propyl, butyl, pentyl, and hexyl; aryl groups such as phenyl; or some R19 to R24 groups can be alkyl groups while others can be aryl groups. The value of n can generally vary from 2-300, thus providing oligomers and/or polymers having a viscosity at 25° C. ranging from 20 to 100,000 centipoise (mPa·s).

Most preferred are silanol endblocked polydimethylsiloxanes with a viscosity of in the range of about 45-90 centipoise (mPa·s) having the structure:

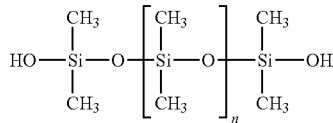

These silanol endblocked siloxanes are known in the art, and are available in commercial quantities and varying viscosity from such manufacturers as the Dow Corning Corporation, Midland, Mich.

The Silicone Resin

Silicone resins appropriate for use herein include resinous compositions of the type described in U.S. Pat. No. 2,676,182 (Apr. 20, 1954), U.S. Pat. No. 4,310,678 (Jan. 12, 1982), U.S. Pat. No. 4,423,095 (Dec. 27, 1983), and U.S. Pat. No. 5,356,585 (Oct. 18, 1994), to which the interested reader is referred, as well as the particular compositions described below.

As used herein, the acronym MQ is a term relating to silicone resins and was derived from the symbols M, D, T, and Q each of which represent a functionality of different types of structural units which may be present in silicones containing siloxane units joined by ≡Si—O—Si≡ bonds. Thus, as used in the art, the monofunctional (M) unit represents $(CH_3)_3SiO_{1/2}$ and the difunctional (D) unit represents $(CH_3)_2SiO_{2/2}$. The trifunctional (T) unit represents $CH_3SiO_{3/2}$ and results in the formation of branched linear siloxanes. The tetrafunctional (Q) unit represents $SiO_{4/2}$ which results in the formation of crosslinked and resinous silicone compositions. Hence, MQ is used herein when the siloxane contains all monofunctional M and tetrafunctional Q units, or at least a high percentage of M and Q units such as to render the silicone resinous.

The MQ silicone resins useful herein are therefore non-linear siloxane resins having a glass transition temperature (Tg) above 0° C. Glass transition temperature is the temperature at which an amorphous material such as a higher silicone polymer changes from a brittle vitreous state to a plastic state. The silicone resin generally has the formula $R'_aSiO_{(4-a)/2}$ wherein R' is a monovalent hydrocarbon group with 1-6 carbon atoms or a functionally substituted hydrocarbon group with 1-6 carbon atoms, and a has an average value of 1-1.8. The silicone resin will preferably consist of monofunctional (M) units $R''_3SiO_{1/2}$ and tetrafunctional (Q) units $SiO_{4/2}$, in which R'' is the monovalent hydrocarbon group having 1-6 carbon atoms, most preferably the methyl group.

Typically, the number ratio of M groups to Q groups will be in the range of 0.5:1 to 1.2:1, so as to provide an equivalent wherein a in the formula $R'_aSiO_{(4-a)/2}$ has an average value of 1.0-1.63. Preferably, the number ratio is 0.6:1 to 0.9:1. Most preferred are silicone MQ resins in which the number of Q units per molecule is higher than 1, preferably higher than 5.

The silicone resin may contain 1-5 percent by weight of silicon-bonded hydroxyl radicals such as a dimethylhydroxysiloxy unit $(HO)(CH3)_2SiO_{1/2}$. In addition and if desired, the silicone resin may contain minor amounts of difunctional (D) units and/or trifunctional (T) units. Preferred silicone resins however, are the MQ silicone resins having a viscosity of at least 100,000,000 (100 million) centistoke ($mm^2/s$), and a softening temperature of less than about 200° C.

Some resinous compositions also suitable for use herein include (i) silicone resins of the type $M_xQ_y$ where x and y have values such that the silicone resin contains at least more than 5 Q units per molecule; (ii) silicone resins of the type $M_xT_y$, where x and y have values such that the silicone resin contains at least more than 5 T units per molecule; (iii) silicone resins of the type $M_xD_yT_pQ_q$ where x, y, p, and q have values such that the sum of Q and T units is at least more than 5 units per molecule, and the number of D units varies from 0-100; DT resins containing difunctional (D) units $(CH_3)_2SiO_{2/2}$ and trifunctional (T) units $CH_3SiO_{3/2}$; and silicone T resins, i.e., polysilsequioxanes containing trifunctional (T) units $CH_3SiO_{3/2}$.

The Surface Active Agent

Oil-in-water emulsion compositions according to the invention are prepared using a surfactant. The surfactant may be an anionic surfactant, cationic surfactant, nonionic surfactant, amphoteric surfactant, or a mixture of surfactants. Nonionic surfactants and anionic surfactants are preferred, and most preferred are mixtures containing an anionic and a nonionic surfactant, or a mixture containing two nonionic surfactants. When a mixture containing two nonionic surfactants is used, it is preferred that one nonionic surfactant have a low Hydrophile-Lipophile Balance (HLB) and the other nonionic surfactant have a high HLB, such that the two nonionic surfactants have a combined HLB of 11-15, preferably a combined HLB of 12.5-14.5.

Representative examples of suitable anionic surfactants include alkali metal soaps of higher fatty acids, alkylaryl sulphonates such as sodium dodecyl benzene sulphonate, long chain fatty alcohol sulphates, olefin sulphates and olefin sulphonates, sulphated monoglycerides, sulphated esters, sulphonated ethoxylated alcohols, sulphosuccinates, alkane sulphonates, phosphate esters, alkyl isothionates, alkyl taurates, and alkyl sarcosinates. One example of a preferred anionic surfactant is sold commercially under the trademark Bio-Soft® N-300. It is a triethanolamine linear alkylate sulphonate composition marketed by the Stephan Company, Northfield, Ill.

Representative examples of suitable cationic surfactants include alkylamine salts, quaternary ammonium salts, sulphonium salts, and phosphonium salts. Representative examples of suitable nonionic surfactants include condensates of ethylene oxide with long chain fatty alcohols or fatty acids such as a $C_{12-16}$ alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, and fatty amine oxides. Representative examples of suitable amphoteric surfactants include imidazoline compounds, alkylaminoacid salts, and betaines.

Representative examples of suitable commercially available nonionic surfactants include polyoxyethylene fatty alcohols sold under the trademark BRIJ® by Uniqema (ICI Surfactants), Wilmington, Del. Some examples are BRIJ® 35 Liquid, an ethoxylated alcohol known as polyoxyethylene (23) lauryl ether, and BRIJ® 30, another ethoxylated alcohol known as polyoxyethylene (4) lauryl ether. Some additional nonionic surfactants include ethoxylated alcohols sold under the trademark TERGITOL® by The Dow Chemical Company, Midland, Mich. Some example are TERGITOL® TMN-6, an ethoxylated alcohol known as ethoxylated trimethylnonanol; and various of the ethoxylated alcohols, i.e., $C_{12}$-$C_{14}$ secondary alcohol ethoxylates, sold under the trademarks TERGITOL® 15-S-5, TERGITOL® 15-S-12, TERGITOL® 15-S-15, and TERGITOL® 15-S-40. If desired, surfactants containing silicon atoms can also be used, i.e., silicone polyethers.

Optional Additives

A first optional additive that can be used is a preservative to reduce and or eliminate microbial activity in the water-based emulsion composition. Representative examples of some suitable preservatives are the compound 5-chloro-2-methyl-4-isothiazolin-3-one sold under the tradename Kathon LX by the Rohm and Haas Co., Philadelphia, Pa., and the compound 1-(3-chloroallyl)-3,5,7-triaza-1-azoniaadamantane chloride sold under the trademark Dowicil® 75 by The Dow Chemical Company, Midland, Mich.

A second optional additive that can be used is an antifoam. Representative examples of some suitable antifoams are silicone antifoams such as silica filled polydimethylsiloxane sold by the Dow Corning Corporation, Midland, Mich.; and organic antifoams such as hydrocarbon oils sold under the trademark Advantage® by Hercules Incorporated, Wilmington, Del.

A third optional additive that can be used, if the composition will be used as an exterior waterproof coating, is a mildewcide, including materials classified as algicides, antimicrobials, bactericides, disinfectants, or fungicides; and which are organic or inorganic materials which reduce biological activity on a substrate. Representative examples of some suitable mildewcides include proprietary fungicide compositions sold under the trademark Troysan® Polyphase® P-20T by the Troy Chemical Company, East Hanover, N.J.; diiodomethyl-p-tolylsulfone sold under the trademark Amical® by Angus Chemical Co., Buffalo Grove, Ill.; tribasic copper sulfate; and stabilized chlorine dioxide.

A fourth optional additive that can be used, if the composition will be used as an exterior waterproof coating, is a UV absorber/UV light stabilizer. Representative examples of some suitable UV absorber/UV light stabilizers are substituted benzotriazole and hindered amines sold under the trademark Tinuvin® by Ciba-Geigy Corporation, Hawthorne, N.Y.

A fifth optional additive that can be used to protect compositions during storage or in low temperature applications is a freeze-thaw ingredient such as ethylene glycol.

Amount of the Components in the Composition

The amount of the various components used to prepare water-based compositions according to the invention is not critical, but generally should be in the following ranges. Thus, the composition can contain (i) 0.1-99 percent by weight, preferably 30-90 percent by weight of the methylhydrogensiloxane; (ii) 0.1-99 percent by weight, preferably 0.1-50 percent by weight of the silanol endblocked siloxane; (iii) 0.1-99 percent by weight, preferably 0.1-50 percent by weight of the silicone resin; (iv) 0.1-10 percent by weight, preferably 1-5 percent by weight of the surfactant; and (v) 0.01-5 percent by weight, preferably 0.1-2 percent by weight of each of the optional additives, i.e., the preservative, antifoam, mildewcide, UV absorber/UV light stabilizer, and freeze-thaw additive. Since the preferred compositions herein are water-based compositions, the balance of the mixture or emulsion to 100 percent consists of water. Typically, the amount of solids in compositions according to the invention should be 0.1-90 percent by weight, preferably 5-50 percent by weight.

Preparation and/or Emulsification Procedure

Water repellent compositions for treating surfaces according to this invention can be made by simply mixing together the various ingredients. Where a composition is desired in the form of an emulsion for example, it can be made by (i) making one emulsion of the several ingredients; (ii) making several emulsions each containing one or more of the ingredients, and combining the several emulsions; or (iii) by following the procedure for (i) or (ii) and then adding some of the ingredients directly to water. Mixtures and emulsions can be made using any suitable source of shear, such as a high speed stirrer, a homogenizer, sonolator, micro-fluidizer, Turello change can mixer, Ross mixer, Eppenbach colloid mill, and similar devices. Where appropriate, hand mixing can also be employed. The procedure for making the mixtures and emulsions can include the direct addition of oil to water/solvent, or the indirect addition of water/solvent to oil. Preferably, the particle size of the active ingredient(s) in the discontinuous or internal phase of an emulsion should be between about 0.1 micrometer ($\mu$m)/100 nanometer to about 5 micrometer ($\mu$m)/5,000 nanometer.

When compositions of the invention are prepared as emulsions, typically the low HLB surfactant is first added to a preformed mixture of the organosilicon components, i.e., (i), (ii), and (iii). Then an aqueous phase containing the high HLB surfactant is prepared, to which is admixed the mixture of organosilicon components (i) to (iii) and the low HLB surfactant. The combined ingredients are mixed to form a crude emulsion, which is then sonolated to complete the emulsification.

Water repellent compositions can be formulated as concentrated mixtures or emulsions having a high solids content for later dilution and direct application to a substrate; or they can be formulated as ready-to-use mixtures or emulsions with low solids content for direct application to the substrate. The actual amount of water repellent composition employed will vary, depending upon the nature of the substrate being treated, but in general, it should be sufficient to provide the substrate with a coating containing about 0.1-40 percent by weight of the solids in the water repellent composition being applied.

One especially preferred emulsion composition according to the invention is formed by combining (i) a first portion of a methylhydrogensiloxane fluid, (ii) a silicone MQ resin in a solution of a second portion of the methylhydrogensiloxane fluid, (iii) a silanol endblocked siloxane, (iv) two nonionic surface active agents consisting of Brij® 30 and Brij® 35, (v) a preservative, and (vi) water. The mixture is then subjected to high shear conditions using a Sonolator or homogenizer to form an aqueous silicone oil-in-water emulsion.

Water repellent compositions according to the invention generally are suitable for application to cellulosic surfaces such as wood, fabric, fiber, paper, and paperboard; masonry surfaces such as porous inorganic substrates including concrete, mortar, brick, stone, gypsum, stucco, terra cotta, adobe, plaster, limestone, marble, porcelain, and tile; siliceous minerals; and concrete building structures.

The method of application of the water repellent composition is preferably by topical treatment or topical coating of the substrate, but the use of these water repellent compositions can include their incorporation directly into a substrate during its manufacture, i.e., as an additive in a paper slurry, or as an ingredient in a concrete mix prior to its setting. When applied topically, for best results, it is preferred that the substrate be treated when it is dry, but substrates can be treated when they are damp or wet.

EXAMPLES

The following example is set forth in order to illustrate the invention in more detail.

Example 1

The following ingredients were weighed into a 28 liter cylindrical plastic tank; (i) 9.4228 kg of a trimethylsilyl terminated methylhydrogensiloxane fluid having a viscosity of approximately 2-5 mm²/s (cP) at 25° C.; (ii) 0.698 kg of an MQ silicone resin; and (iii) 1.380 kg of a hydroxyl terminated dimethylpolysiloxane fluid having a viscosity of approximately 45-90 mm²/s (cP) at 25° C. The mixture of components (i) to (iii) was agitated for 15 minutes with a mechanical stirrer. To the mixture was added (iv) 0.161 kg of polyoxyethylene (4) lauryl ether nonionic surfactant; (v) 0.276 kg of a 72 percent aqueous solution of polyoxyethylene (23) lauryl ether nonionic surfactant; and (vi) 11.0285 kg of water. The mixture of components (i) to (vi) was stirred moderately for 35 minutes. The mixture was then processed in two passes through a laboratory Sonolator. The Sonolator was operated at approximately 1,800 psi (12,410 kPa), and it was equipped with a 0.010 inch (0.0254 cm) orifice. The resulting silicone oil-in-water emulsion contained approximately 60 percent by weight of silicone particles having a mean particle size of approximately 0.767 um.

Other variations may be made in compounds, compositions, and methods described herein without departing from the essential features of the invention. The embodiments of the invention specifically illustrated herein are exemplary only and not intended as limitations on their scope except as defined in the appended claims.

The invention claimed is:

1. An emulsion containing particles having a size of 0.1-5 µm wherein said emulsion is prepared by adding a low HLB nonionic surfactant to a preformed mixture of;
   (i) 30-90 percent by weight of a methylhydrogensiloxane having the formula:

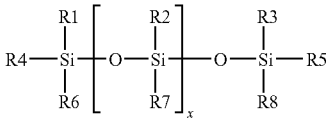

wherein R1 to R8 each represent hydrogen or an alkyl group containing 1- 6 carbon atoms, with the proviso that at least one of the groups R1 to R8 is hydrogen, and x is 1-200;
   (ii) 0.1-50 percent by weight of a silanol endblocked siloxane having the formula

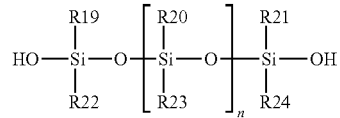

wherein R19 to R24 each represent an alkyl group containing 1-6 carbon atoms or an aryl group, or some R19 to R24 are alkyl groups while other R19 to R24 groups are aryl groups; n is 2-300; and the silanol endblocked siloxane has a viscosity at 25° C. of 20-100,000 centipoise (mPa·s);
   (iii) 0.1-50 percent by weight of an MQ silicone resin; then mixing an aqueous phase containing a high nonionic HLB surfactant to the preformed mixture to form the emulsion;
   wherein the high and low HLB nonionic surfactants have a combined HLB ranging from 11 to 15 and the total amount or the nonionic surfactants is 0.1 - 10 percent by weight of the emulsion, with the proviso that all components in the emulsion sum to 100 percent by weight.

2. A method of imparting water repellent characteristics to the surface of a substrate comprising applying In the surface the emulsion according to claim 1.

* * * * *